United States Patent [19]
Dorfman

[11] 3,985,330
[45] *Oct. 12, 1976

[54] DISPOSABLE INNER MOULD FOR BOATS

[76] Inventor: Jan William Dorfman, 173 Roxborough Ave. East, Toronto, Ontario, Canada

[ * ] Notice: The portion of the term of this patent subsequent to Sept. 3, 1991, has been disclaimed.

[22] Filed: May 30, 1974

[21] Appl. No.: 474,368

Related U.S. Application Data

[63] Continuation-in-part of Ser. No. 364,003, May 25, 1973, Pat. No. 3,832,745.

[52] U.S. Cl. .................................. 249/65; 9/6 R; 264/314
[51] Int. Cl.² ..................... B28B 7/32; B63B 5/00
[58] Field of Search ............ 249/10, 65, 127, 134, 249/183; 425/440; 264/313, 314, 316, 32; 156/156, 252

[56] References Cited
UNITED STATES PATENTS

| | | | |
|---|---|---|---|
| 3,057,368 | 10/1962 | Seaman | 264/32 |
| 3,184,210 | 5/1965 | Fassnacht | 249/53 |
| 3,344,007 | 9/1967 | Skoggard | 264/314 X |
| 3,388,446 | 6/1968 | Phillips | 9/6 X |
| 3,497,886 | 3/1970 | Burnett | 156/156 X |
| 3,506,746 | 4/1970 | Fontaine | 264/32 |
| 3,619,432 | 11/1971 | Harrington | 264/314 X |
| 3,643,910 | 2/1972 | Heifetz | 249/65 |
| 3,749,594 | 7/1973 | Bibb | 9/6 X |
| 3,814,372 | 6/1974 | Western | 249/65 |
| 3,832,745 | 9/1974 | Dorfman | 9/6 P |

*Primary Examiner*—Francis S. Husar
*Assistant Examiner*—John S. Brown

[57] ABSTRACT

A disposable inner mould or form for the construction of a boat hull, such mould comprising a hollow hull-shaped form made of flexible non-stretch plastic sheet material tailored in the shape of the inner surface of the boat hull. There may also be provided means for securing such form in an inverted position on a base member, means for inflating said form to adopt its predetermined non-stretch tailored hull-shape as aforesaid, and contour control means for supporting portions of the form to retain it in its tailored hull-shape. The form may have an opening at the stern end for reception of a rigid panel therein.

14 Claims, 7 Drawing Figures

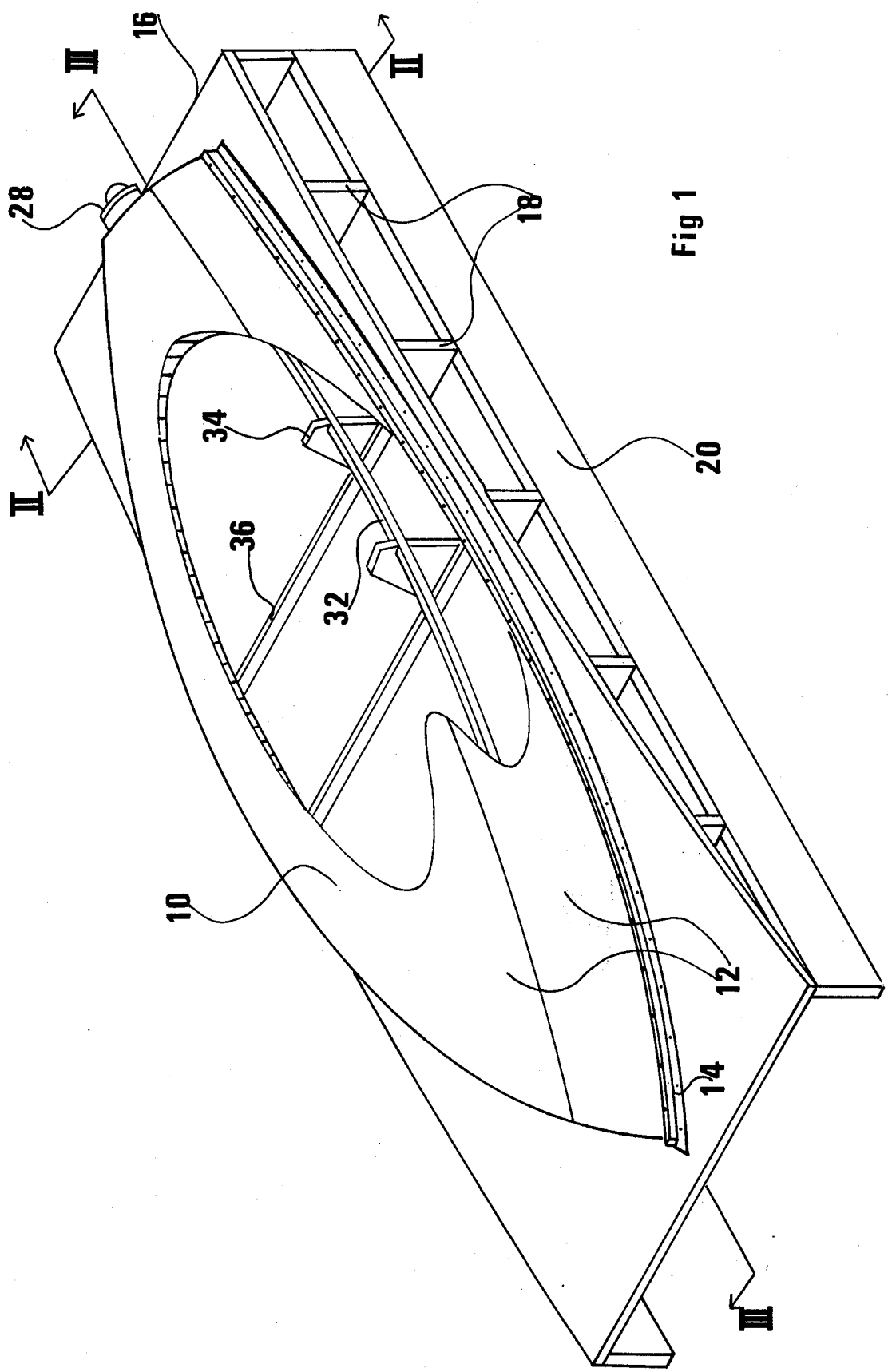

DISPOSABLE INNER MOULD FOR BOATS

This application is a continuation-in-part of application Ser. No. 364,003 filed May 25th., 1973, entitled DISPOSABLE INNER MOULD FOR BOATS now U.S. Pat. No. 3,832,745.

The invention relates to a disposable inner mould for the construction of boats formed of glass reinforced plastic resin material, and to a method of boat building.

BACKGROUND OF THE INVENTION

The construction of boats of fibreglass has usually involved the building of an inner form or male mould. The surface of this inner form was then highly polished, and a female mould, i.e., an outer form was then constructed on the inner form. This outer form was usually constructed in two longitudinal halves, and when assembled, the boat was then built by laying up successive layers of glass material, the outermost layer of the article being in fact in contact with the inside surface of the mould. In this way, the boat was constructed with a perfectly smooth exterior surface, and with an interior surface which was somewhat rough and unfinished. However, usually this interior roughness did not matter since it would be concealed.

The construction of an inner form followed by the construction of an outer mould is an extremely expensive and time consuming operation and greatly increases the construction costs of such articles.

New glass reinforced building techniques have been developed in which the boat was built from the inside out. In this form of construction all that is required is to build the inner form, and then start laying up the glass material from the inside of the boat hull. In this way, it was unnecessary to provide a very high degree of finish on the surface of the inner form, since the inner surface of the hull would in any event be concealed. The use of this technique resulted in the development of new construction materials and techniques including so-called "sandwich" materials such as plastic foam sheet, and balsa wood and the development of a suitable form of material or filler for forming a smooth exterior surface such as talc, or a specially developed filler material known as "micro-balloons." By the use of these techniques, it is possible to build a boat having a glass reinforced inner shell, an intermediate layer of sandwich material such as plastic foam or balsa wood and an outer glass layer, the outer glass layer being finished with a layer of resin material and filler such as talc or micro-balloons which could then be sanded down very easily to a satisfactory finish.

However, even this form of construction, while being a great improvement over the old form of construction, still requires the production of an accurate inner form which is usually built of wood.

As a result of the requirement for building the inner form, it is usually found that these improved techniques are not available to the average home boat builder. In most cases, he cannot build the inner form himself, and it is uneconomical for a manufacturer to build the inner plug and supply it to the home builder. As a result, the usual practice in the trade is to build the boat hulls in a factory, and a hull will then either be finished in the factory, or shipped to the new owner's home where he may finish it himself. In either case, the finishing costs or the shipping costs are very considerable and greatly increase the basic cost of the hull, and the factory labour portion of the cost of the hull itself also adds substantially to the end price.

It is therefore desirable that some means should be provided whereby a home boat builder can actually erect the inner plug or mould in his home and then build the hull on it. In this way, the greatest degree of economy is achieved, leading to increased sales of glass and resin and sandwich core materials, and a wider interest in boating, and the home building of boats, and a more profitable utilisation of the leisure time of the individual home builder.

Portable moulds or forms for hollow articles or structures have been proposed in the past, usually based on the principle of an inflated body of some kind. Such inflatable moulds have been relatively crude and clumsy, however, and suitable only for building structures having simple, regular geometric contours. Such prior systems have not been suitable for the contruction of boats, since boat hulls have complex convex and concave compound curves, that must be built to close tolerances, in order to perform in accordance with the specifications of the designer.

BRIEF SUMMARY OF THE INVENTION

The invention therefore seeks to provide a disposable inner mould or form for the construction of a boat hull, such mould comprising a hollow hull-shaped form made of flexible non-stretch plastic sheet material tailored in the shape of the inner surface of the boat hull, and means for securing such form in an inverted position on a base member, means for inflating said form to adopt its predetermined non-stretch tailored hull-shape as aforesaid, and contour control means for supporting portions of the form to retain it in its tailored hull-shape.

More particularly, it is an objective of the invention to provide a disposable inner mould or form having the foregoing advantages in which the contour control means takes the form of inner bracing means mounted within the inflated form, and supporting the same from the interior.

It is a further and related objective of the invention to provide a disposable inner mould or form of the type described, in which the contour control means takes the form of a base member, to which the form is attached, the base member being deformed into a predetermined contour to control the contours of the form.

It is a related objective of th invention to provide an inflatable mould for making a boat with a flattened stern in which the mould has an open end corresponding to the flattened stern for reception of a rigid panel therein.

The invention also provides internal support for the pointed end or ends of the mould.

The foregoing and other objectives will become apparent from the following description of a preferred embodiment of the invention which is given here by way of example only with reference to the following drawings.

BRIEF DESCRIPTION OF THE DRAWINGS

FIG. 1 is a perspective illustration of a mould for a boat hull according to the invention, shown erected and inflated on a base member, with a portion thereof being cut away to reveal the interior;

DESCRIPTION OF A PREFERRED EMBODIMENT

Figure 4:
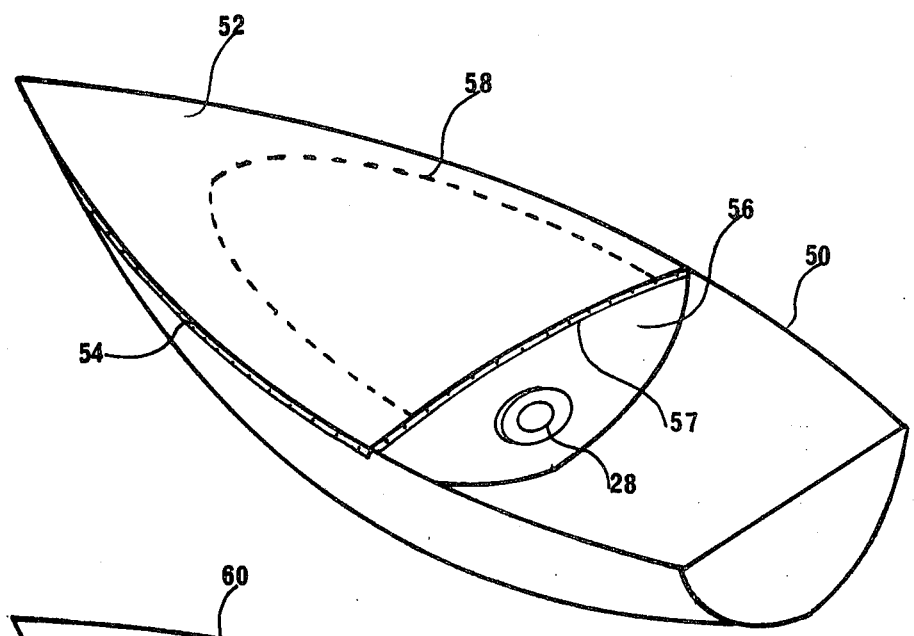
FIG. 4 is a perspective illustration of a boat hull, with a deck mould for forming a portion of the deck shown mounted in position thereon.

Referring now to the illustrations it will be seen that the invention comprises a flexible boat shaped form 10 formed of non-stretch plastic material.

The form 10 is preferably formed of a plurality of panels 12, and panels 12 are cut and seamed together, preferably by heat sealing or ultrasonic welding techniques but alternatively may be sealed together by stitching or some form of adhesive bonding. The cutting and fastening of the panels 12 is carried out in accordance with a predetermined pattern whereby the shape of the form 10 is tailor made to adopt the hull-shape as shown in FIG. 1, conforming to the interior dimensions and contours of the hull of the boat to be built. The plastic material is of the non-stretch plastic sheet type such as is used for other forms of inflatable shelters such as are used as temporary buildings at construction sites and the like, such material being available in a variety of different thicknesses depending upon the size of structure to be built.

The form 10 is provided with a perpheral lip or flange 14, and the lip or flange is itself fastened to a base board or mounting board 16. Preferably, a paper pattern will be supplied to the home builder showing the outline of the deck plan of the boat, and the home builder will then mark or scribe the base board 16 with this outline so as to insure that the flange 14 of the form 10 is fastened accurately in position.

Preferably, the base board or mounting board 16 is of a bendable ply wood material or alternatively may be of some other form of bendable panel forming material such as a plastic or hard board panel.

The base board 16 is mounted on a series of spaced apart transverse cross members 18. The cross members 18 are themselves supported on longitudinal support frames 20. The cross members 18 are arranged with different heights, decreasing in height from the stern of the boat to the bow. The base member 16 is fastened to the cross members 18, and at the bow of the boat the base member 16 is fastened directly to the longitudinal frames 20 or to any other suitable cross member (not shown). In this way, the base member 16 is formed into a continuous curve, to provide the shear line of the gunwale of the boat. The form 10 is tailor made to fit the curvature of the base member 16, so that by supporting the base member 16 in this predetermined continuous curve as shown, the form 10 is supported and retained by the base member 16 in its predetermined tailored hull like shape.

Preferably, the home builder will be supplied with a set of templates showing the exact height of each of the cross members 18, and another set of templates or guides or patterns showing exactly how far apart they are to be spaced in relation to the length of the support frames 20.

The construction of the form 10 is such that the stern end of the form 10 is open, that is to say there is no plastic panel forming part of the form 10 which would correspond to the stern or transom of the boat.

This portion of the form 10 is provided by a panel 22 of wood or the like material provided with a profile, corresponding to the profile of a pattern or template supplied to the home builder, which profile will conform exactly to the profile of the stern portion of the form 10.

The stern panel 22 is fastened in a predetermined location on the base panel 16, and the form 10 is fastened around the stern panel 22 in any suitable manner such as by nails, (not shown), or staples, or mastic or the like.

Figure 2:
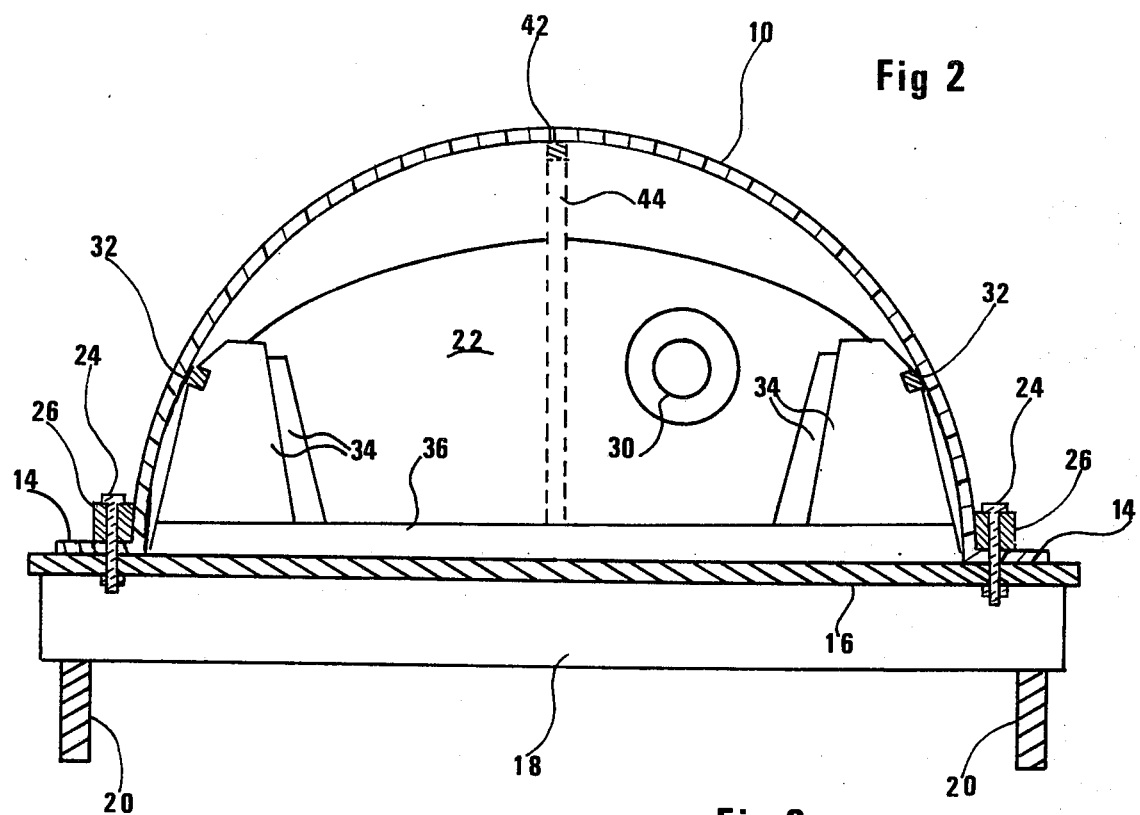
FIG. 2 is a section along the line II—II of FIG. 1.

The side flange 14 of the form 10 is preferably fastened to the base board 16 as shown in FIG. 2, by means such as the fastening bolts 24 passing through the wooden hold down strip 26, whereby to procure a good air tight seal between the flange 14 and the base board 16.

In order to inflate the form 10, any suitable means may be provided such as the fan 28, attached to the opening 30 in the stern panel 22. The fan 28 should preferably be provided with a motor of sufficient capacity that it can be run continuously for several days if necessary and the fan 28 must be of sufficient size so as to maintain the form 10 in a stable, relatively rigid condition during the initial lay up of the first glass layer.

In order to further control the contours of the form 10, interior support means are provided in the form of the inner support ribs 32 mounted on support brackets 34 which are themselves fastened in pairs to transverse spacer members 36. Each spacer member 36 and its pair of support brackets 34 are mounted at spaced apart stations along the length of the base board 16 in accordance with a predetermined pattern provided to the home builder.

In order to support the bow portion of the form 10, and hold it secure in its predetermined tailored contour, a further contour support member 38 is provided which has a predetermined contour conforming to the interior contour of the bow portion of the form 10, the contour supporting member 38 being further supported by means of the support bar 40 fastened to one of the spacer members 36 as shown.

In practise, it is found that with this degree of interior support, many boats of varying sizes may be constructed without difficulty. However, in some cases, depending upon the particular contours of the hull-shape of the boat for example or in the cases of larger boats, it may be desirable to provide an extra further interior support rib, such additional optional support rib being shown in phantom form in FIG. 2 as rib 42. Rib 42 will run along the interior of the median of the form 10 from bow to stern, being supported at spaced intervals on support members shown in phantom as 44.

It will, however, be understood that the additional rib 42 and support members 44 are optional, and are not strictly speaking necessary in the majority of cases.

In operation, the home builder will receive inflatable form 10, a fan 28, and a series of support brackets 34, and may also receive a stern panel 22. He will also receive a complete set of the patterns of templates for marking out the positions of the fastenings for the various other members.

He will then obtain a supply of lumber or other suitable material and with the use of the templates or pattern he will then mark out the exact position for the fastening of the various members on the base board 16, and will also prepare the appropriate cross members 18 of the appropriate size and mark out their exact position on the support frames 20. He will then fasten the various members together, and fasten the ribs 32 in position on the support brackets 34. He will then fasten the form 10 in position over the ribs 32, and secure the flanges 14 of the form 10 along the predetermined markings which he has already marked out on the base board 16.

He will then install the fan 28, fasten the form 10 to the curved portion of the stern panel 22, and operate the fan to inflate the form 10.

The form 10 immediately inflates and adopts its predetermined tailored hull-shape, and will remain in that shape so long as the fan 28 is running. Obviously, there will be some degree of leakage of air, but so long as the fan 28 remains running this will create no problem and the form 10 will be for the purposes of boat building at least substantially rigid or at least sufficiently rigid to lay up the first glass layer. Once this inner layer has set of course it will usually have sufficient inherent rigidity that the form 10 is not longer necessary, and the fan 28 can be switched off. However, for safety sake it will usually be preferable to continue operation of the fan 28 during the layup of the sandwich layer of plastic foam or other material. For this purpose, the use of the plastic foam sandwich material for this type of construction is considered preferable to other materials. Other sandwich materials such as balsa wood and the like may be suitable if sufficiently flexible. Some materials are too stiff and have to be held in position by some special form of securing means, and this of course creates difficulties with the form 10 which is a hollow inflatable structure. On the other hand, when using the specialized foam plastic sandwich materials, these materials can be rendered sufficiently flexible that they may simply be placed in position over the inner glass layer, and bonded to the inner glass layer by additional resin material. The outer glass layer is then laid up on the sandwich material, and when it is set it can then be finished with a layer of resin and filler.

When completed, the boat hull can then simply be lifted off the form 10, and the form 10 can then, if it is no longer required, simply be thrown away, or in some cases, if it has not become damaged in the removal of the hull, it can be reused.

Completion of the hull will, of course, involve insertion of a suitable shaped panel in the transom of the hull, and any other finishing work which will normally be required in the boat building process.

It will thus be seen that by the practise of the invention an economical simple form of the inner boat mould is provided, which may be packaged and sold for example through the mails or in department stores or in any other location, and which may be used by even a relatively unskilled home boat builder with a minimum of difficulty to produce a boat hull having a high standard of accuracy and finish with a minimum of specialized tools or knowledge.

At the same time, great flexibility of design is achieved since the shaping of the form 10 is controlled entirely by the tailoring of the panels 12, and the layout and bending of the base board 16, stressing and establishing the contours for the mould, and also by the interior supporting ribs 32. Thus it is possible to experiment with a wide variety of different designs with a minimum of mould cost.

Figure 5:
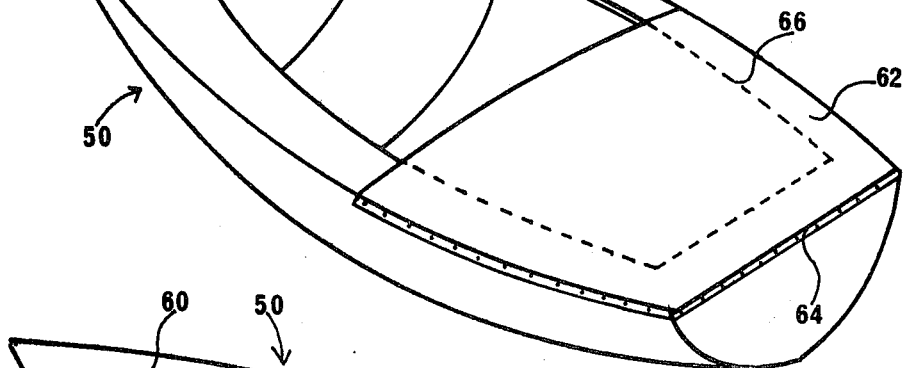
FIG. 5 is a perspective illustration of a boat hull with a further form attached thereto for making a further portion of the deck.
Figure 6:
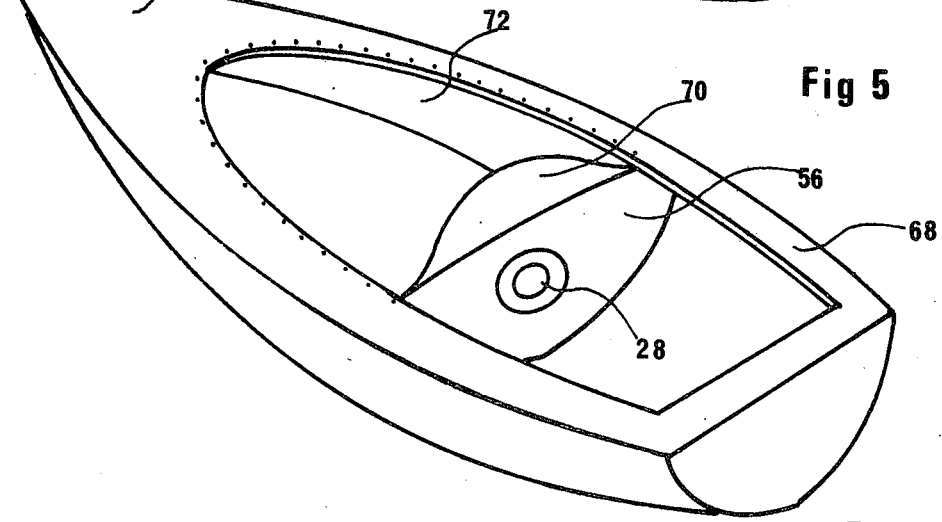
FIG. 6 is a perspective illustration of a boat hull with a further mould for making the cabin top, and, FIG. 7 is a sectional illustration of an alternate embodiment.

In accordance with further embodiments of the invention, it is possible to build the deck and cabin top of a boat in various stages, these stages being shown successively in FIGS. 4, 5, and 6.

As shown in FIG. 4, a boat hull is shown as 50, and the forward deck portion of the deck may be constructed by means of the inflatable form 52 attached around the forward and midship portion of the hull 50 by the attachment flange 54 and any suitable fastening means such as nails, staples or the like.

In order to close off inner portion of the hull 50, a wooden bulk head 56 is fitted within the hull 50, and aft portion of the deck form 52 is attached thereto by means of the attachment flange 57. A suitable hole or opening (not shown) is cut in the bulk head 56, and the fan 28 is mounted in connection therewith so as to blow air into the closed forward portion of the hull 50. In this way, the form 52 is inflated into the desired shape, and glass reinforced resin may then be laid up as before, together with sandwich materials. Since it will be desirable to form the forward deck portion of the hull 50 with a cabin top, the form 52 is provided with a suitable marking or indicator 58, and the deck of the hull 50 will be glassed only up to the limits of the marking 58. Once completed, the glassed portion of the deck shown in FIG. 5 as 60 will then be lifted off the form 52, and the form 52 can then simply be stripped off and disposed of. The forward deck portion 60 is then placed back in position in contact with the hull 50, and by means of any suitable jointing means, such as for example glass reinforced resin material, the deck and hull are attached to one another.

In order to complete the rearward portion of the deck, or a suitable combing around the cockpit portion of the boat, the bulkhead 56 will remain in position and the fan 28 is simply removed from the rearward side of the bulk head 56 and attached to the forward side. A further form 62 is then fastened in postion by means of attachment flanges 64, and the same procedure is carried out once more. Again, since it is not desirable to fill in the entire cockpit area, a suitable marking 66 is provided on the form 62 to indicate the limits to which glassing should be carried out. When this has been completed the glass portion, shown in FIG. 6 as 68 is then removed, the form 62 is stripped off and disposed of, and the deck portion or combing 68 is then replaced and attached in position as described before.

In order to complete the cabin top, the fan 28 is once again removed from the forward portion of the bulk head 56 and attached to the rearward side. An additional bulk head portion 70 is then attached to the top of bulk head 56, shaped to define the profile of the cabin top. A further inflatable form 72 is then attached around the edge of the forward deck portions 60, and around the additional bulk head portion 70. The fan is then operated once more, and the cabin top may then be glassed in over the form 72. The fan 28 is then removed, and a suitable doorway or companion way may then be cut into the bulk head 56 and additional bulk head portion 70, and a portion of the cabin top (not shown). It is then possible to obtain access to the interior of the hull once again, and the form 72 can then be simply stripped off from the underneath of the cabin top.

Thus, it will be seen that by the practice of the invention it is possible to build both a boat hull, and deck, and cabin top, in successive stages, using inflatable moulds, by means of sealing off various different portions of the hull and inflatable mould at different stages in the construction.

Clearly, if desired for construction of larger boats for example a greater number of stages could be introduced in order to provide for a greater variety of deck and cockpit formations, and to provide for example a centre cockpit layout with forward and aft cabins, for example, and any other variations in the construction that might be desirable.

Figure 3:
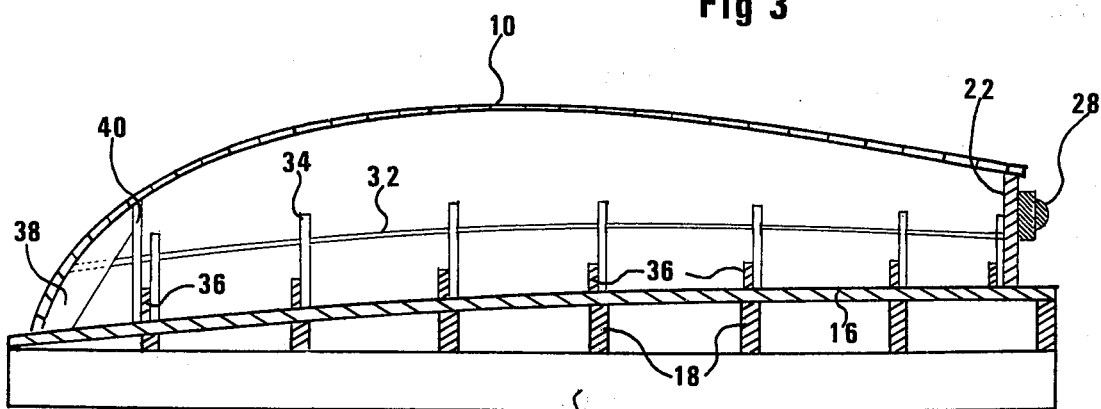
FIG. 3 is a section along the line III—III of FIG. 1.

While in connection with the embodiment of FIGS. 1, 2, and 3, the inflatable form 10 is shown as fastened to a rectangular base board 16, according to a predetermined marked outline on the base board 16, it will of course be appreciated that for some forms of construction this system can be slightly modified. This type of construction will tend to produce a flange or rib extending outwardly from the boat hull around the shear line or gunwale. In some forms of boat or boat hull this may be undesirable. Accordingly, in order to avoid this the base board 16 can itself be cut in the shape of the plan outline of the hull, and the form 10 can simply be attached around the edge of such base board 16 which is then bent over the cross members 18 in the manner shown and described. In this way, the upper edge of the boat will not be defined by an outwardly directed flange and this may be an advantage in certain forms of hull.

It is believed that such a modification is self evident from the illustrations and this description and further illustration is not required.

Figure 7:
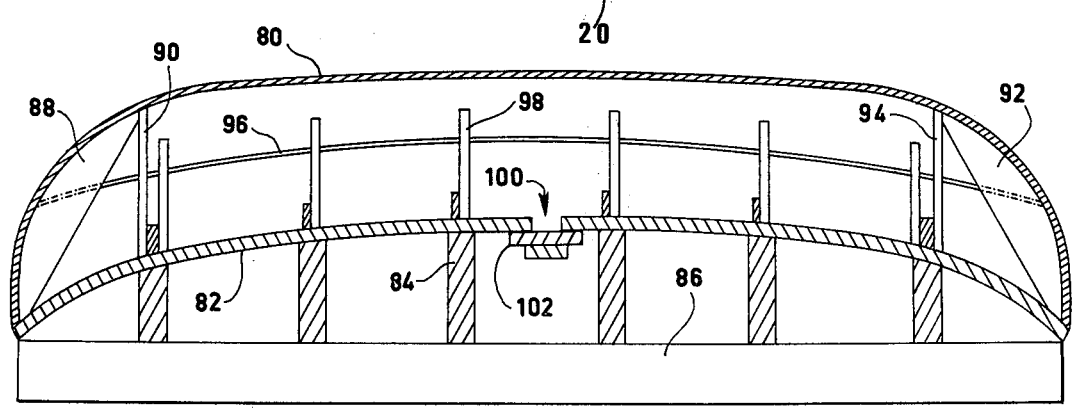

The invention may also be used to construct a canoe, or boat hull pointed at both bow and stern. As shown in FIG. 7, this embodiment of the invention comprises a form 80 made of a plurality of panels which are cut and seamed together to provide the hull shape of a canoe. The various panels of the form 80 are not shown in this illustration for the sake of simplicity.

The form 80 is fastened on a base board or mounting board 82 in the manner described above. In order to provide a shear for both bow and stern of the canoe, the base board 82 is supported in a continuous curve on the crossmembers 84 which are themselves supported on longitudinal support frames 86. The crossmembers 84 are tallest in the middle, and are somewhat shorter towards each end of the support frames 86, and the base board 82 is fastened down on the crossmembers 84 so as to provide a smooth regular curve from the bow to the stern as shown.

The bow end of the form 80 is supported by means of the bow support member 88, and support bar 90. The support member 88 is preferably any suitable plank cut to the appropriate profile to define the profile of the bow of the interior of the canoe to be built on the form 80.

The stern end of the form 80 is supported by a similar support member 92 and support bar 94. The contour defined by the stern member 92 may be the same or may be slightly different from the contour of the bow support member 88, but functions in essentially the same way that is to say it defines the profile around which the stern end of the form 80 is tensioned, when the form 80 is inflated.

Similarly, the interior of the form 80 from bow to stern is supported by means of inner support ribs 96 mounted on support brackets 98 which are themselves fastened on the base board 82. The support brackets 98 are mounted at spaced apart intervals or so called stations, along the length of the interior of the form 80, as described above.

In order to inflate the form 80, any suitable opening such as the port 100 is provided through the base board, and the fan 102 is attached in communication with the port, for passing air into the interior of the form 80.

It will be understood that the fan means may be supplied as part of the kit, or may be obtained separately by the purchaser. The term "means for inflating" as used in the claims is therefore intended to cover any opening or ductwork through which air may be passed into the form, and is not restricted solely to a fan. For example, a domestic vacuum cleaner could possibly be used, equipped with a suitable governor or speed regulator.

While the form 10 is shown as having an open end, with the panel 22 inserted therein, it could be supplied with a rigid panel of any suitable material, such as wood, rigid plastic or the like, permanently attached thereto, ready for mounting on the base member.

The use of the embodiment of FIG. 7 proceeds in essentially the same manner as is already described above.

The foregoing is a description of a preferred embodiment of the invention which is given here by way of example only. The invention is not to be taken as limited to any of the specific features as described but comprehends all such variations thereof as come within the scope of the appended claims.

This is a Continuation-in-Part of United States Application Number 364,003, Disposable Inner Mould for Boats and Method of Manufacture, filed May 25, 1973.

What I claim is:

1. A disposable inner mould for the construction of a boat hull, said mould comprising;
   a hollow, hull shaped form made of flexible non-stretch plastic sheet material tailored into the shape of the inner surface of the boat hull and having two sides, a bottom and bow and stern ends, at least the bow end of which is characterised by the two sides tapering to a point;
   means for securing and sealing said form in an inverted position on a base member thereby enclosing between itself and said base a space sealed against the escape of gases therefrom;
   means for passing a gaseous medium into said space and inflating said form to extend into its predetermined non-stretch tailored hull shape above said base member as aforesaid, and,
   contour support means mounted on said base member and extending upwardly into said form and contacting and supporting the interior of said pointed end of said form whereby to retain it in its tailored predetermined non-stretch shape.

2. A disposable mould as claimed in claim 1 including at least two inner bracing members mounted on said base member within said form and spaced at a predetermined elevation above said base member, and contacting the interior of said form along its length for supporting the same and controlling the contours therefrom.

3. A disposable mould as claimed in claim 1, wherein said base member is curved into a predetermined shape, whereby to stress said form and control the contours thereof and support it in its predetermined hull shape.

4. A disposable mould as claimed in claim 3 including means supporting said base member at spaced intervals along the length of said form, said support means having varying dimensions whereby to maintain said base member in its curved formation.

5. A disposable mould as claimed in claim 1 wherein said contour support means comprises a panel member having an edge shaped to conform to said interior profile of said pointed end of said form, and support bar means attached thereto for supporting the same on said base member.

6. A disposable mould as claimed in claim 5 including opening means formed in said base member, and fan means in communication with said opening means for inflating said form as aforesaid.

7. A disposable mould as claimed in claim 1 wherein both said ends of said form are pointed and including a base member, curved into a predetermined contour, said form being fastened to said base member, and substantially pneumatically sealed thereagainst, and bow and stern support members mounted on said base member, and having a profile shaped to conform to the interior of the bow and stern ends of said form;

inner bracer members mounted on said base member within said form and extending from end to end thereof, and located to contact the interior of said form when the same is inflated whereby to locate portions of said form, and maintain them in their predetermined tailored hull shape when inflated;

opening means in said base member, and, fan means connected to said opening means for inflating said form as aforesaid.

8. An inflatable inner mould for the construction of a boat hull having a curved gunwale, said mould comprising;

a hollow, hull shaped form made of flexible non-stretch plastic sheet material tailored into the shape of the inner surface of the boat hull having bow and stern ends and a curved gunwale contour extending therebetween, at least one of said ends being pointed;

a base member curved into a predetermined shape corresponding to said gunwale contour of said boat hull;

means for securing and sealing said form in an inverted position on said base member;

means for inflating said form to adopt its predetermined non-stretch tailored hull shape as aforesaid, and, contour support means for supporting the interior of the form at predetermined points therein whereby to retain it in its tailored predetermined non-stretch hull shape.

9. A disposable mould as claimed in claim 8 including at least two inner bracing members mounted within said form spaced at a predetermined elevation above said base member, and adapted to contact the interior of said form for supporting the same and controlling the contours therefrom.

10. A disposable mould as claimed in claim 9 including means supporting said base member at spaced intervals along the length of said form, said support means having varying dimensions whereby to maintain said base member in its curved formation.

11. An inflatable boat mould adopted to be inflated and supported by interior pressure of gaseous media such as air for use in the construction of boat hulls of the tye having a pointed bow, sides a bottom, and a flattened stern defining a line of juncture with said sides and bottom, said hull being formed in an inverted manner by boat building materials laid on said mould when the same is inflated, said mould comprising;

sheet of flexible non-stretch plastic material tailored and fastened together into a predetermined tailored hull shape, having a hollow generally concave interior and a generally convex exterior, the exterior defining a smooth regular moulding surface for reception of boat building materials thereon and adapted to receive a gaseous inflation media within its interior and defining;

a pointed end portion corresponding to the shape of said pointed bow of said hull, at one end of said hull shape;

an open end portion at the stern end of said hull shape corresponding to the shape of said line of juncture at said flattened stern, and adapted for reception of a rigid stern panel therein closing the same;

and further defining sealing flange means along either side of said hull shape for fastening said mould in position on a base member, and sealing it thereon whereby to retain said gaseous media therein within said concave interior, said plastic material, when fastened as aforesaid being adapted to be inflated by said gaseous media within its interior to adopt its predetermined tailored hull shape.

12. An inflatable boat mould as claimed in claim 11 wherein there are four said sheets of material extending longitudinally along said hull shape.

13. An inflatabe boat mould as claimed in claim 11 wherein the flange means defines a line of curvature corresponding to the line of curvature of the gunwale of said boat hull.

14. An inflatable boat mould as claimed in claim 11 including a rigid panel member shaped to conform to the shape of said line of juncture at said flattened stern, said panel member being fastened in and attached to said stern end portion of said sheets of plastic material.

* * * * *